Patented Jan. 18, 1949

2,459,431

UNITED STATES PATENT OFFICE 2,459,431

COLD PROCESSED FRUIT SPREAD

Gestur Johnson, Albany, and Mildred May Boggs, Berkeley, Calif., assignors to the United States of America as represented by the Secretary of Agriculture No Drawing. Application April 26, 1946, Serial No. 665,038

13 Claims. (Cl. 99—132)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention is directed to the development of a method of making gelled fruit products that retain to a large degree the natural flavor, color, and nutritive values, such as vitamin C, of the original fresh fruits. Usual methods require heating of the product in the course of processing. Heating changes the flavors, colors, and nutritive factors. Storage temperatures ordinarily used, above freezing, also cause changes in flavor, color, and nutritive value. The problem is therefore one of combining fruits, purees or juices, with sugars, pectin, and in some cases fruit acids, in such proportions as to make a gel which, when stored at freezing temperature, retains the flavors, colors, and certain nutritive values, ordinarily difficult to retain, of the original fruits.

All jellies and jams as sold on the market today are prepared by boiling fruit with or without water. In the preparation of jellies, the fruit juice is expressed and strained to make a clear product. This process is omitted in the preparation of jams. Sugar is added to the boiled fruit or clarified juice and boiling continued in order to concentrate the mixture to a point where gelation will take place on cooling. Cooking also hydrolyzes the protopectin, inverts the sugar (sucrose), and sterilizes the product. Fruit acids and pectin concentrates are commonly added in order to obtain the most effective relationship of sugar, pH, and pectin. This method of preparation and storing of finished product at room temperature tends to alter the natural fruit flavor and color and to destroy most of the ascorbic acid (vitamin C). The high sugar concentration (65 to 68 percent) also tends to mask the fruit flavor of these products.

Douglas (U. S. Patent No. 1,082,682 (1913)) was the first to realize that heating is not an essential for pectin jelly formation. Spencer (Jour. Phys. Chem. 33, 1987–2011 (1929)) presented data on pectin gels made by mixing a sugar sirup, acid or alkali, and pectin solutions at room temperature. The preparation of pectin-gelled food products by cold processing was described by Paul and Grandseigne (Bul. Assoc. Chim. Sucr. Dist. 46, 233, 245 (1929)), who utilized the naturally occurring enzyme pectase present in fruit juices to deesterify the pectin, which then gelled through its reaction with the calcium content of the juice. Evans and Huber (Canadian Patent No. 404,707) prepared gels without heating by combining a soluble salt of pectic acid and a lactone, which slowly hydrolyzed to form a weak edible acid and caused the formation of a pectic acid gel. Mnookin (U. S. Patent No. 2,253,389 (1941)) prepared mixtures containing milk powder, pectin, calcium salt, and sufficient alkali to partially deesterify the pectin, the whole then setting into a calcium pectinate gel. A process for the preparation of canned cranberry gel was recently developed by Baker and Goodwin (Food Indus. 13(8):45, 56 (1941)), whereby gels were prepared by heating well below the boiling temperature. In our process we use mixtures of sugar, high-methoxyl (ordinary commercial) pectin, and sliced and crushed or pureed fruit, or fruit juice possessing a natural or adjusted pH in the range preferably of 2.6 to 3.5, to produce a gelled fruit product, without heating, which does not require the presence of an enzyme, an alkali, or a lactone to cause gelation. This gel is preserved and can be distributed in the frozen state. This process is described in greater detail below.

The steps in one example of the process are as follows:

1. The ripe fruit is pureed. This puree can be made into gelled products immediately or frozen for later use. The puree may contain crushed or sliced fruits. The process can be applied to clarified extracted juices.

2. Powdered pectin, not to exceed 1 percent of the finished product by weight, is mixed with part of the sugar, or with 2 to 3 times its weight of glycerine and this mixture is stirred into the puree. The amount of sugar mixed with the powdered pectin should be such that the puree mixture at this stage does not contain in excess of 30 percent of soluble solids. The puree is then slowly stirred until the pectin is hydrated. Hydration requires approximately one half hour at room temperature (about 70° F.), but a longer time at lower temperatures.

3. Fruit acid is added to adjust the pH, if necessary, to 3.5 or lower, preferably to pH 3 when possible.

4. The remainder of the sugar is dissolved in the puree.

5. The mixture is packaged and allowed to stand at 70° to 100° F. until properly gelled. The time required for gelling should not exceed 24 hours, preferably. Longer gelling time is an indication of improper pectin-pH-sugar relationship.

6. The gelled product is preserved in freezing storage.

This process of manufacture is especially applicable to all fruits whose natural pH is approximately 3.5 or lower and to other fruits whose pH can be lowered practically to this level. An excellent working range of pH is 2.9 to 3.1. The finished gelled products contain from 45 to 60 percent of soluble solids; this soluble-solids content means that 40 to 55 percent of added sugar is required It is generally known that, for most practical purposes, jellies containing about 65 percent of sugar are preferable for the most economical use of pectin or pectin material when the boiling process is used. However, the requirement of high-methoxyl pectin (8 percent or higher) in gelled products made by the cold process is no greater than for boiled jellies, even when about 15 percent lower sugar concentration is used.

The yield of finished product by the proposed method is greater than is obtained in the manufacture of jams and preserves. Formulas for fancy "50–50" jams and preserves, made with equal amounts of fruit and sugar, yield only approximately 77 percent of the weight of the original ingredients as finished product. Standard jams and preserves made with 45 percent of fruit and 55 percent of sugar yield approximately 75 percent of the original weight of the ingredients as finished product, and "imitation" jams and preserves made from fruit and sugar in the ratio of 35 to 65 yield 80 percent of the original weight. The yield obtained by the proposed method is equal to 100 percent of the weight of the prepared sliced, crushed, pureed fruit or fruit juice and other ingredients.

The compositions of some examples of our cold-processed fruit gels preserved by freezing are as follows:

| Product | Fruit puree | Added pectin [1] | Added sugar | Approximate soluble solids [2] | Added citric acid | pH |
|---|---|---|---|---|---|---|
| | Per cent | Per cent | Per cent | Per cent | Per cent | |
| Guava (Var. 1) | 49.75 | 0.25 | 50 | 55–56 | 0 | 3.05 |
| Guava (Var. 2) | 49.50 | 0.25 | 50 | 55–56 | 0.25 | 2.98 |
| Raspberry | 49.25 | 0.50 | 50 | 55–56 | 0.25 | 3.08 |
| Raspberry | 46.25 | 0.40 | 53 | 58–59 | 0.25 | 3.08 |
| Loganberry | 49.75 | 0.50 | 50 | 55–56 | 0 | 3.05 |
| Boysenberry | 49.75 | 0.45 | 50 | 55–56 | 0 | 3.00 |
| Apricot | 49.1 | 0.62 | 50 | 59–60 | 0.25 | 3.50 |
| Red currant | 47.6 | 0.37 | 50 | 56–57 | 0 | 2.85 |
| Strawberry | 47.1 | 0.45 | 52.1 | 56–57 | 0.15 | 3.05 |
| Plum (Santa Rosa) | 48.75 | 0.45 | 50.8 | 56–57 | 0 | 3.0 |
| Blackberry | 48.25 | 0.45 | 51.0 | 56–57 | 0.25 | 3.02 |

[1] Rapid-set citrus pectin, grade 185.
[2] As measured by refractometer.

The main variables involved in this process are quality of pectin and the relationship of pectin, pH, and sugar. This relationship must be carefully controlled in order to obtain a satisfactory product. Increasing the sugar content and/or increasing the acidity (lowering the pH) reduces the pectin requirement, and the opposite is also true. Mineral constituents present or added may also affect gel formation. Part of the sugar (sucrose) can be replaced with corn sugar (glucose). Rapid-set, high-methoxyl citrus pectin, grade 180 or better, and high-methoxyl apple pectin, grade 250 or better, with not over 3 to 4 percent of ash, are satisfactory pectins. These grades for pectin refer to the pectin grade prior to dilution of pectin with sugar to the usual commercial grade of 150. Other fruit acids commonly used in food products can be used in place of citric acid.

The process is not confined to the preparation of preserve-like, jam-like, or jelly-like jelled fruit product. It can be applied equally well in the preparation of sundae toppings, shortcake material, consumer packs, and similar fruit products preserved by freezing. These products may consist of whole or sliced fruit mixed with gelled, crushed, or pureed fruit or fruit juices. The degree of gelation and resulting texture can be controlled and varied according to desire or requirement in the product.

Having thus described our invention, we claim:

1. A process of preparing gelled fruits in which a fruit of the group consisting of fruit juice, pureed fruit, pureed fruit containing crushed fruit, and pureed fruit containing sliced fruit, is mixed with an amount of powdered high-methoxyl pectin not to exceed 1 percent of the finished product by weight, and with an amount of sugar such that the mixture at this stage does not contain in excess of 30 percent of soluble solids by weight; stirring the mixture at room temperature until the pectin is hydrated; adjusting the pH of the mixture to 3.5 or below by adding a fruit acid, when the pH of the mixture is above 3.5; then adding more sugar in an amount to total 40 to 55 percent of added sugar and to result in a finished product having from 45 to 60 percent of soluble solids, the mixture being allowed to stand at about 70° F. to 100° F. until gelled.

2. The process of claim 1 in which the fruit acid is citric acid.

3. The process of claim 1 in which the fruit is a pureed fruit.

4. The process of claim 1 in which the fruit is raspberry.

5. The process of claim 1 in which the fruit is strawberry.

6. The process of claim 1 in which the fruit is blackberry.

7. The process of claim 1 in which the pectin is mixed with glycerine before being added to the fruit.

8. The process of claim 1 in which part of the sugar is sucrose and part glucose.

9. The process of claim 1 in which the product is packaged prior to gelling and the gelled product preserved in freezing storage.

10. The process of claim 1 in which the fruit is one whose natural pH is approximately 3.5 or below.

11. The process of claim 1 in which the pH of the mixture is in the range 2.9 to 3.1.

12. A method of cold-processing fruits in which a fruit is mixed with an amount of high-methoxyl pectin not to exceed 1 percent of the finished product, by weight, and with an amount of sugar such that the mixture at this stage does not contain in excess of about 30 percent by weight of soluble solids; allowing the mixture to stand until the pectin is hydrated adjusting the pH to about 3.5 or below by adding a fruit acid when the pH of the mixture is above 3.5; then adding sugar in an amount to total about 40 to 55 percent of added sugar; and then allowing the mixture to gel at a temperature below about 100° F.

13. The process of claim 12 in which the product is packaged prior to gelling and the packaged gelled product is preserved in freezing storage.

GESTUR JOHNSON.
MILDRED MAY BOGGS.

REFERENCES CITED

The following references are of record in the file of this patent:

UNITED STATES PATENTS

| Number | Name | Date |
|---|---|---|
| 1,304,166 | Douglas | May 20, 1919 |
| 1,898,336 | Boyles | Feb. 21, 1933 |

OTHER REFERENCES

Spencer-Jr. Phys. Chem., vol. 33 (1929) pp. 1990–2011.

Baker-Food Industries, Jan. 1941 pp. 55–57.